July 20, 1926.

E. H. CLUTTER 1,593,060

AUTOMATIC BREAD WRAPPING MACHINE

Filed April 26, 1924     10 Sheets-Sheet 2

Fig. 2.

WITNESSES
Guy M Spring
H2092 W Wright

Inventor
ELMER H. CLUTTER

By Richard Blewen
Attorney

July 20, 1926.

E. H. CLUTTER

AUTOMATIC BREAD WRAPPING MACHINE

Filed April 26, 1924    10 Sheets-Sheet 3

WITNESSES

Inventor
ELMER H. CLUTTER
By Richard B. Owen
Attorney

July 20, 1926.

E. H. CLUTTER 1,593,060

AUTOMATIC BREAD WRAPPING MACHINE

Filed April 26, 1924   10 Sheets-Sheet 5

WITNESSES

Inventor
ELMER H. CLUTTER

By Richard B. Owen
Attorney

July 20, 1926.

E. H. CLUTTER

AUTOMATIC BREAD WRAPPING MACHINE

Filed April 26, 1924   10 Sheets-Sheet 7

1,593,060

Inventor
ELMER H. CLUTTER

July 20, 1926.

E. H. CLUTTER

1,593,060

AUTOMATIC BREAD WRAPPING MACHINE

Filed April 26, 1924   10 Sheets-Sheet 8

Patented July 20, 1926.

1,593,060

UNITED STATES PATENT OFFICE.

ELMER H. CLUTTER, OF EUREKA, MONTANA, ASSIGNOR TO CLUTTER AND SCOTT MANUFACTURING CO., OF EUREKA, MONTANA.

AUTOMATIC BREAD-WRAPPING MACHINE.

Application filed April 26, 1924. Serial No. 709,228.

This invention appertains to an automatic wrapping machine and the primary object of this invention is to provide an improved type of machine for automatically wrapping loaves of bread without necessitating the handling of the bread by the operator of the machine, the machine being so constructed as to permit a great number of loaves of bread to be wrapped in a small amount of time.

Another object of the invention is to provide novel means for carrying the loaves of bread to be wrapped into the machine, and novel means for cutting and feeding a strip of wrapping paper upon the entrance of each loaf of bread into the machine, said paper feeding and cutting mechanism being set into motion by the loaves of bread themselves, thereby eliminating the waste of paper.

A further object of the invention is the provision of a reciprocatory frame embodying an actuating rack bar for the paper feeding mechanism, normally arranged below and out of engagement with said mechanism, and novel means actuated by each loaf of bread coming into the machine for raising said rack bar, for causing the actuation of the paper feeding and cutting mechanism.

A further object of the invention is the provision of a vertically traveling carriage for receiving bread from the bread feeding means, and novel means for passing the bread into the carriage with the strip of paper cut.

A further object of the invention is the provision of novel means for folding the paper about the bread during the travel of the carriage, and novel means for forcing the wrapped loaf of bread from the carriage upon the completion of the carriage stroke.

A further object of the invention is the provision of novel means for sealing the bread after the same has been wrapped.

A further object of the invention is the provision of novel means for synchronously actuating all of the parts of the bread-wrapping machine from a single prime mover disposed upon the frame of the said machine.

A still further object of the invention is to provide a novel bread-wrapping and sealing machine of the above character, which will be durable and efficient in use, one which will be comparatively simple and easy to manufacture and one which can be placed upon the market and operated at a minimum cost.

With these and other objects in view, the invention consists in the novel construction, arrangement and formation of parts, as will be hereinafter more specifically described, claimed and illustrated in the accompanying drawings, in which drawings:—

Referring to the drawings in detail, wherein similar reference characters designate corresponding parts throughout the several views, the letter A generally indicates the frame for the improved bread-wrapping and sealing machine; B the means for feeding the loaves of bread into the machine; C the paper guiding and cutting mechanism for the bread; D the means for setting the paper-cutting mechanism into operation by the entrance of loaves of bread into the machine; E the carriage for receiving the bread after the same has set the cutting mechanism into operation; F the means for passing the loaf of bread into the carriage; G the means for reciprocating the carriage; H the means for folding the paper about the bread during the reciprocatory movement of the carriage; I the means for thrusting the bread from off of the carriage; and J the means for sealing the bread after the same has been wrapped. It is to be noted that the portion of the frame which initially receives the bread is termed the front of the frame throughout the specification.

The frame A of the machine can be made of any preferred material, and as shown includes four corner posts 20 which can be secured together and braced in any desired way. A bottom platform 21 is carried by the posts and this platform supports various parts of the operating mechanism for the bread-wrapping machine and the prime mover 22 for actuating said parts. As shown the prime mover is an electric motor, but it is to be understood that other driving means can be employed. The corner posts 20 which are arranged in longitudinal alignment are connected together by pairs of horizontally extending beams 23, 24 and 25, and as shown the terminals of the side beams 23 and 25 extend beyond the rear faces of the rear corner standards or posts 20. The top side bars 26 are also employed for forming a part of the frame and serve as means for supporting a part of the paper cutting and feeding mechanism, which will be hereinafter more fully described.

The means B for feeding the loaves of bread to be wrapped into the machine consists of a forwardly extending substantially U-shaped metal frame 27 and the inner ends of the arms of the frame 27 are bolted or otherwise secured to a cross brace 28 disposed intermediate the ends of the frame A.

Figures 5, 15:
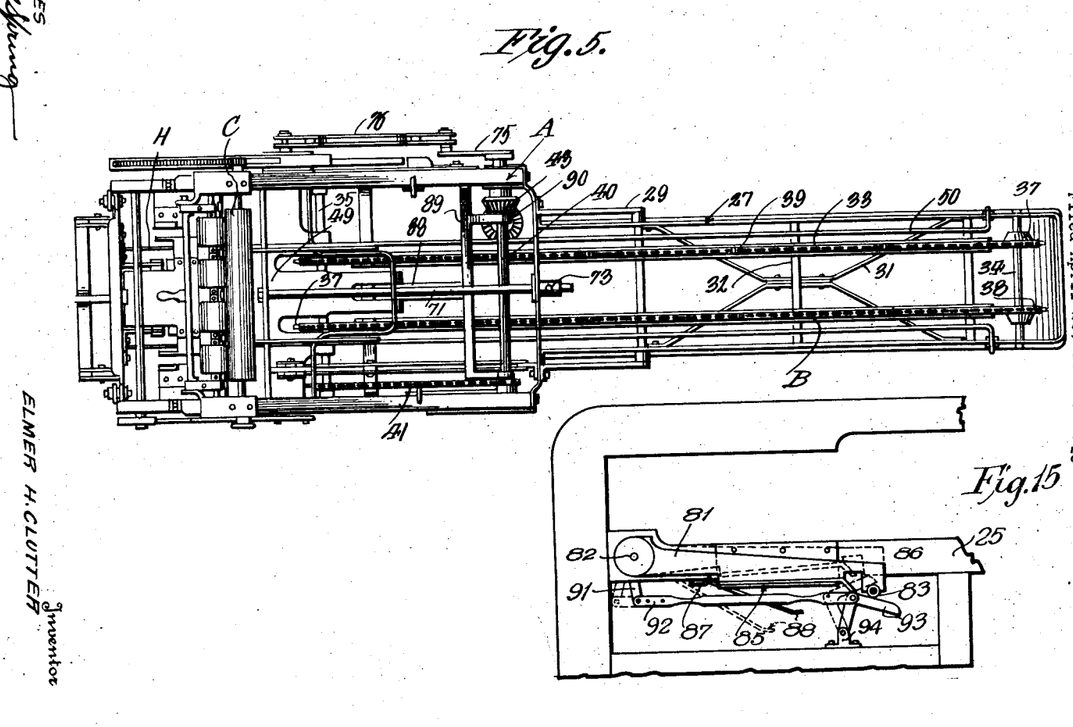
Figure 5 is a top plan view of the improved machine.
Figure 15 is an enlarged fragmentary view illustrating the system of levers and operating mechanisms for controlling the feeding of the paper strips.

The U-shaped forwardly extending frame 27 is braced by arcuate side brackets 29 which are secured to the top cross bar 30, as clearly shown in Figure 5 of the drawings. The forwardly extending U-shaped frame 27 is braced by diagonally extending brace rods 31 clearly shown in Figure 5 of the drawings. These brace rods 31 and transverse brace rods 32 preferably support a pair of spaced longitudinally extending strips 33 which are of a flat configuration and which form tracks for a purpose which will be hereinafter more fully described. The extreme forward end of the U-shaped frame 27 rotatably supports a transverse shaft 34 and this shaft is arranged in parallel relation to a transverse shaft 35 which is carried by the frame A in any preferred manner. As shown the shaft 35 is in the same plane with the shaft 34 and has its terminals preferably mounted in bearings 36 carried by the longitudinal bars 24 of the said frame. Each of the shafts 34 and 35 carry pairs of sprocket wheels 37 around which are trained endless sprocket chains 38. These endless sprocket chains 38 carry equi-distantly spaced flights or cleats 39 and the chains 38 with the cleats 39 constitute an endless conveyor for leading the bread into the machine. As shown the shaft 35 is driven from a top driven shaft 40 which is operatively connected to the electric motor 22 by a means, which will now be described. It is to be noted that the driven shaft 40 is operatively connected to the shaft 35 by means of sprocket wheels and a sprocket chain 41. Disposed at one side of the frame A is a vertical driven shaft 42 and this shaft is operatively connected to the horizontal driven shaft 40 by means of beveled gears 43. The shafts 40 and 42 are mounted within suitable bearings carried by the main frame A. The vertical shaft 42 is in turn operatively connected by beveled gears 44 with the main drive shaft 45, which is rotatably mounted in suitable bearings carried by the front corner posts 20. This shaft 45 is driven by a suitable sprocket chain or belt 46 from a reduction gearing 47, which is operatively connected to the armature shaft 48 of the said motor 22. The drive shaft 45 operates other parts of the mechanism, of the bread-wrapping machine, as will be hereinafter more fully described. It is to be noted that the upper run of the endless conveyor chains 38 ride over and rest on the track 33 and that when the bread is laid on the tracks that the said conveyor chains will carry the bread into the machine and the cleats or flights 39 will push the bread onto a platform 49 arranged directly in the rear of the conveyor. It is to be noted that this platform 49 is supported by the longitudinal pair of intermediate side beams 24. Suitable hand rails 50 can be arranged alongside of the conveyor as clearly shown in the drawings for preventing displacement of the bread from off of the conveyor and to isure the correct holding of the bread in position so as to prevent the same from being placed on the conveyor in any position but transversely thereof.

The paper feeding mechanism C embodies a transversely extending shaft 52, which is rotatably carried by suitable brackets 53 connected with the top side bars 26. The shaft 52 has clamped thereto in any desired way a roll of paper 54 of the desired type. It is preferred to use wax paper for wrapping the bread, in order that the bread can be kept in a fresh condition and in order to permit the sealing of the wrapper by simply applying heat thereto and without the use of sealing material such as paste or glue. A resilient arm 55 carried by the cross bar 56 engages the roll of paper 54 in order to normally hold the roll against movement and to prevent the accidental rotation thereof. The paper from the roll is fed between a pair of guide plates 56 arranged adjacent to the rear end of the frame and as shown these plates extend transversely thereof and are arranged directly below the main feed roller 57 and the tension roller 58. By referring to Figure 6 of the drawings it can be seen that the strip of paper is first fed between the roller 58 and the roller 57 and then between the guide plates 56. Below the guide plates 56 is disposed a second pair of guide plates 59, which lead the paper below the bread receiving platform 49 and in rear of the bottom sealing member J as will be hereinafter more fully described. One of the guide plates 59 is provided with a guide knife slot 60 which permits the paper cutting knife 61 to enter into the same during the severing of the paper strip. This knife 61 is preferably provided with a toothed cutting edge and is carried by a transverse bar 62, connected to transversely aligned arms 63 of a pair of bell cranks 64 which are pivoted at their angles as at 65 to a convenient part of the main frame A. The knife 61 is actuated, by means, which will be hereinafter more fully described. It is preferred to have the tension roller 58 constructed from a plurality of independent roller units, all of which are freely rotatable upon a shaft 66 which is slidably mounted in suitable bearings carried by the top bars 26. The bearings have resting against the same expansion springs (not shown) so as to normally urge the rollers 58 into intimate contact with the paper strip. The tension of these springs can be adjusted by suitable machine screws, or the like 68. The end of the feed roller 57 has keyed or otherwise secured to its shaft a pinion 69 which cooperates with the means D, which is actuated by the loaf of bread coming into the machine for causing the feeding and cutting of the paper strip.

Figure 1:
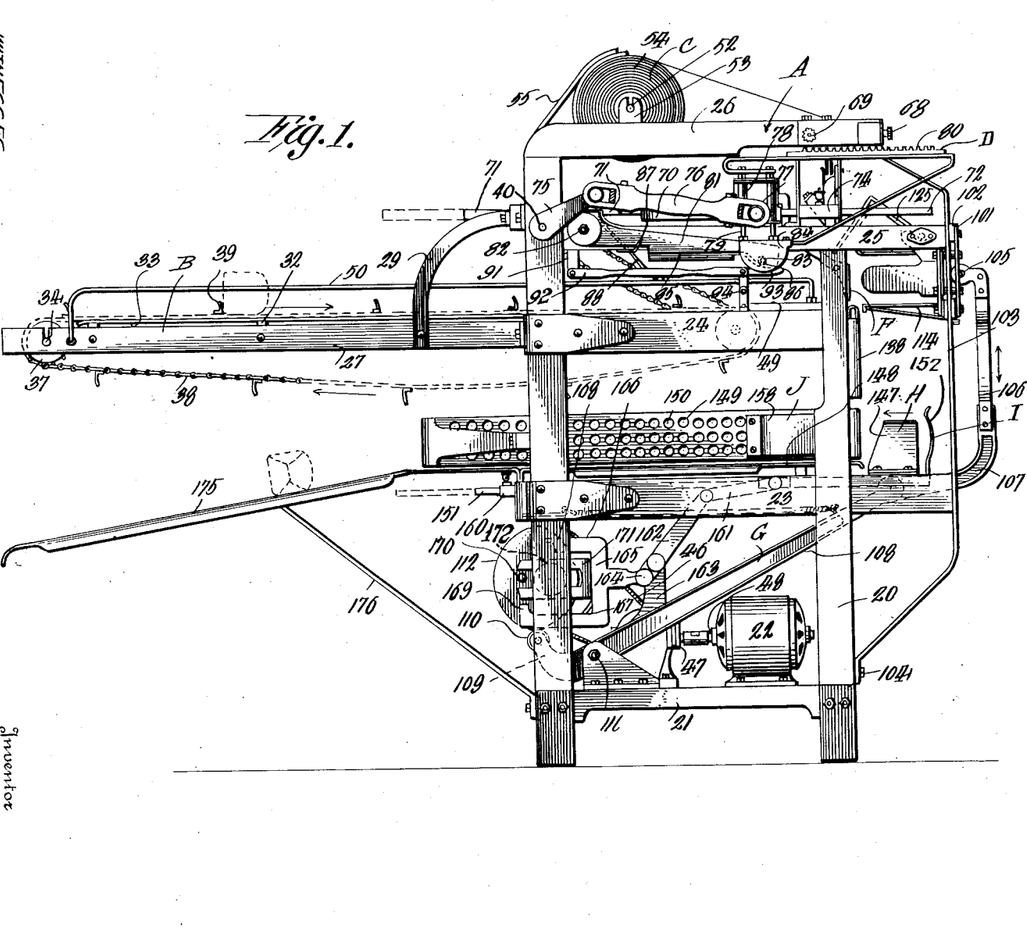
Figure 1 is a side elevation of the improved bread-wrapping and sealing machine.

This mechanism D embodies a horizontally disposed reciprocatory frame 70 which is secured to a centrally disposed forwardly extending cylindrical guide bar 71 and side rearwardly extending cylindrical guide bars 72. The guide bar 71 extends through a suitable guide bushing 73 carried by a front transverse strap 30. The side rearwardly extending guide bars 72 are slidably mounted in bushings 74 carried by the longitudinal side bars 25. It thus can be seen that the frame 70 is suspended at three points for sliding movement horizontally of the main frame and through the motion and action of this frame, different parts are connected to, controlled, timed, and synchronized and operated from the motor. As shown the same is driven from the driven shaft 40 which has connected to one end thereof a crank arm 75 which in turn operates a pitman rod 76, which is operatively connected by means of a connecting pin 77 with the said frame. The frame 70 carries a pair of vertical bearings 78 which reciprocally support a pair of posts 79, the upper ends of which carry a rack bar 80, which is adapted at predetermined times to mesh with the pinion 69 for rotating the feed roller 57 for drawing the paper from off of the roll of paper 54. These posts 79 are secured to the upper surface of a depending head 84, which is disposed at one side of a lever 81. This lever 81 is pivoted at its forward end as at 82 to one of the side bars 25 of the main frame A. The inner face of the head 84 carries a roller 83, shown in dotted lines in Figure 1 of the drawings. A track 85 is formed on one side of the lever 81 and the track is provided with a rearwardly extending downwardly inclined extension 86 shown in dotted lines in Figure 1 of the drawings, and this portion of the track extends inwardly of the head 84 and is adapted to engage the roller 83 carried by the head, when the lever is lowered a predetermined distance, by means, which will be specifically described. At the front end of the track and at spaced relation thereto is a guide and stop 87, for guiding the roller down below the track 85, at a predetermined time, as will be hereinafter more fully described.

Now as stated one of the prime objects of the invention is to provide means for automatically feeding off the paper from the roller 54 by each loaf of bread, as the same enters the machine and in order to bring this about, a flat trip arm 88 is arranged centrally within the machine and extends down over the endless conveying mechanism B. The forward end of this trip arm 88 is formed integral with a cross bar 89, clearly shown in Figure 5 of the drawings. This cross bar 89 carries a pair of forwardly extending hook-shaped teeth 90, which rest over and swing on the shaft 40. These hook-shaped teeth 90 carry a depending leg 91 which has pivotally secured thereto a forwardly extending link 92, the rear end of which has in turn pivotally connected thereto, a lifting lever 93 which is disposed directly under and supports the curved end of the track 85. The part 93 is connected by a bracket 94 with one side bar 24 as clearly shown in the drawings.

Figure 2:
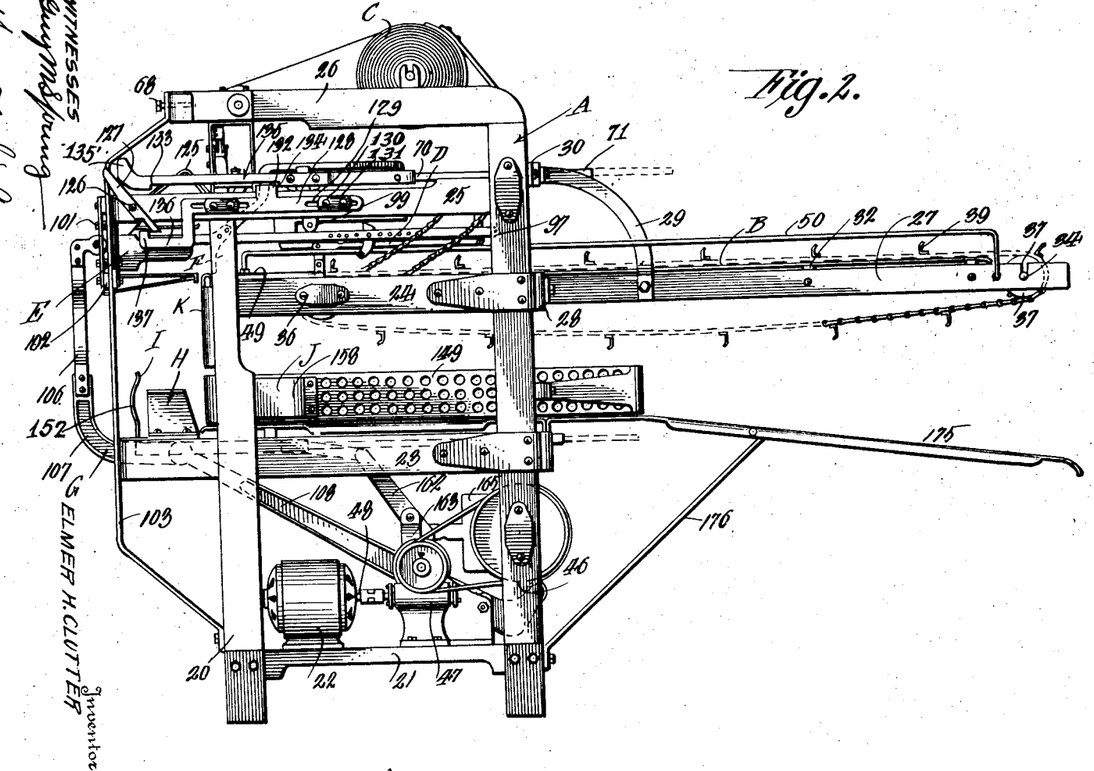
Figure 2 is a similar view looking from the opposite side from Figure 1.
Figure 3:
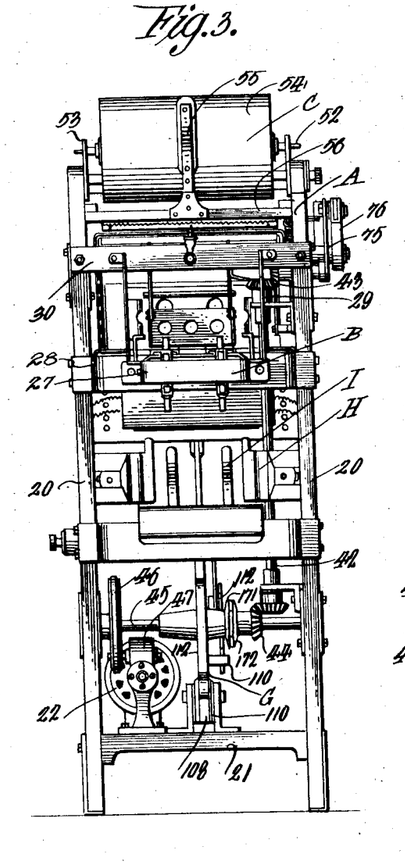
Figure 3 is a front elevation of the improved machine.

Now it is obvious that as a loaf of bread passes into the machine, that the same will engage the arm 88 and raise the same upwardly, which will swing the cross bar 89 and the leg 91 which will lower the trip lever 93 causing the swinging down of the lever 81 directly under the roller to permit the roller to ride on the track 85 during reciprocation of the frame 70. It is obvious that as the crank 75 pulls back on the pitman 76 that the frame 70 will be drawn forwardly and that the roller 83 will ride up on the track 85, consequently lifting the rack bar 80 into engagement with the pinion 69. The forward movement of the rack bar will, of course, rotate the pinion 69 feeding down the desired strip of paper. When the crank arm has reached its extreme forward stroke the roller 83 will engage the guard and stop 87 which will guide the roller down below the track 85 consequently permitting the lowering of the rack bar 80 out of engagement with the said pinion, and then the crank will return the rack bar and reciprocatory frame 70 to their normal positions. If bread is ceased to be fed in the machine, it is obvious that the track 85 will not engage the roller 83 and consequently the head 84 will not be raised during the reciprocation of the frame 70. It thus can be seen that the machine only draws paper when a loaf of bread is placed in the machine to be wrapped. Thus if the operator fails to feed bread no paper is wasted. It thus can be seen that the means D for actuating the paper feeding mechanism operates in conjunction with the reciprocatory platform 70. The means for cutting the paper strip after the predetermined quantity has been sent downward is also controlled by the reciprocatory frame 70 by means, which will now be described. The lower arm of the bell crank lever 63 which is connected with the serrated cutting knife 61 has pivotally connected thereto a link 95 which is in turn pivotally connected to a forwardly extending lever 96. This lever 96 has its forward end pivotally connected as at 97 (shown in Figure 2 of the drawings) to the main frame A and this lever 96 carries at a point intermediate its ends a pivoted dog 98. This dog 98 is arranged to swing forwardly, but is held against swinging movement rearwardly by a suitable pin or the like. This dog 98 is adapted to be tripped by a rigid strip 99 carried by the reciprocatory frame 70. Now it can be seen that when the reciprocatory frame 70 is moved forwardly that the strip 99 will simply rock the dog 98, and that upon rearward movement of the frame 70 that the strip will engage the dog and thus depress the lever 96 rocking the bell crank 63 causing the knife 61 to be brought into forcible contact with the strip of paper which will sever the same.

Figure 4:
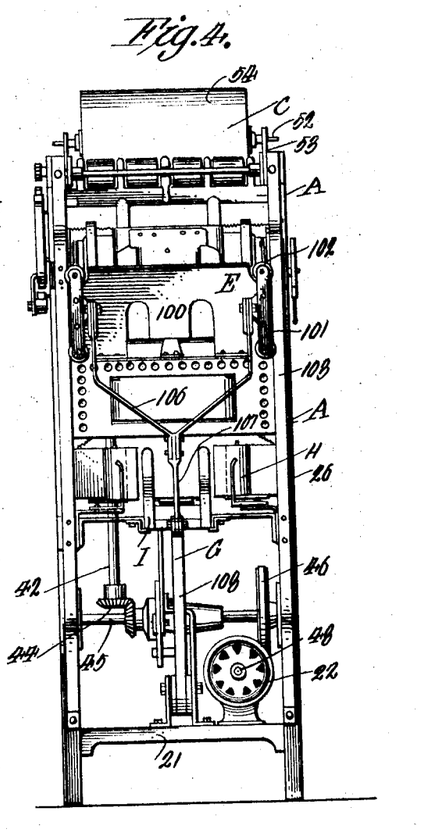
Figure 4 is a rear elevation of the same.

The carriage E for receiving the loaf of bread from the receiving platform 49 is best shown in Figures 7 to 14 inclusive and it might be well to point out at this time, that the strip of paper is sent down in rear of the loaf of bread and the platform 49 and in front of the reciprocatory carriage E, so that when the bread is forced into the carriage by the means F the paper will be partially wrapped about the same. Attention is also invited to the fact that the bread is sent into the machine sideways, and this is of course clearly shown in Figures 1 and 7 to 14 inclusive. The said carriage E embodies a back plate 100 having rigidly secured to its ends straps 101. These straps 101 have rotatably secured to their terminals grooved rollers 102, which travel along the vertically disposed tracks 103. These tracks are secured to the upper and lower ends of the frame at the rear portion thereof, as at 104, as is clearly shown in Figures 1, 2 and 4 of the drawings. This carriage has rockably secured thereto as at 105 a depending yoke 106 which is in turn rigidly connected to an arcuate arm 107. This arm 107 is pivotally connected to a rearwardly extending upwardly inclined operating lever 108 the forward end of which is provided with a right angularly disposed relatively short arm 109 which is provided with an anti-friction roller 110. This lever 108 is pivoted at a point adjacent to its short arm 109 to the platform 21 of the frame A, as at 110. This roller 110 normally engages the periphery of an elliptical-shaped cam 112 which is rigidly secured to the main operating shaft 45. Resilient means is provided for normally holding the roller into engagement with the surface of the cam and it is obvious that after the shaft 45 is operated that the same will rock the lever 108 causing the reciprocation of the carriage E on the track 103.

Now the back plate 100 of the carriage E is provided with a pair of forwardly extending upper and lower plates 113 and 114 between which is adapted to be placed the loaf of bread. It can be seen that these upper and lower plates or walls 113 and 114 snugly receive the loaf of bread when the same is forced into the carriage. It is also obvious that the plates will tend to force the strip of paper about the top and sides of the bread and in order to facilitate this, the inner ends of the walls can be flared as at 115. The rear plate 100 carries resilient side walls 116 and it is to be noted that these walls 116 are arranged at a point intermediate the top and bottom walls and the forward terminals of the walls 116 are slightly flared as at 117 so as to fold in the top flaps of the corner enclosures of the wrapper when the bread is forced into the carriage. The walls, 113, 114 and 116 properly form part of the folding means H for the wrapper, as is of course obvious.

The means F for forcing the loaf of bread into the carriage E comprises a pressure foot 120, which is rigidly carried by an arm 121. This arm 121 is in turn rigidly connected to the reciprocatory frame 70 so that the pressure foot will be reciprocated therewith. The arm 121 carries a depending and laterally extending leg 122. The lower end of this leg 122 carries a roller 123, which is adapted to ride in a track carried by the frame. This track is so arranged, that as the reciprocating frame 70 is moved forwardly, the arm 121 will be raised, so that the pressure foot 120 will ride over a loaf of bread coming into the machine. When the reciprocating frame is moved back the pressure foot 120 is dropped in rear of the bread which carries the bread into the carriage as heretofore described and partially enfolds the wrapper around the bread. Thus it can be seen that as the frame 70 reciprocates back and forth, that the paper will be pulled off of the roll, then cut and the strip forced into the carriage as heretofore described.

Figure 8:
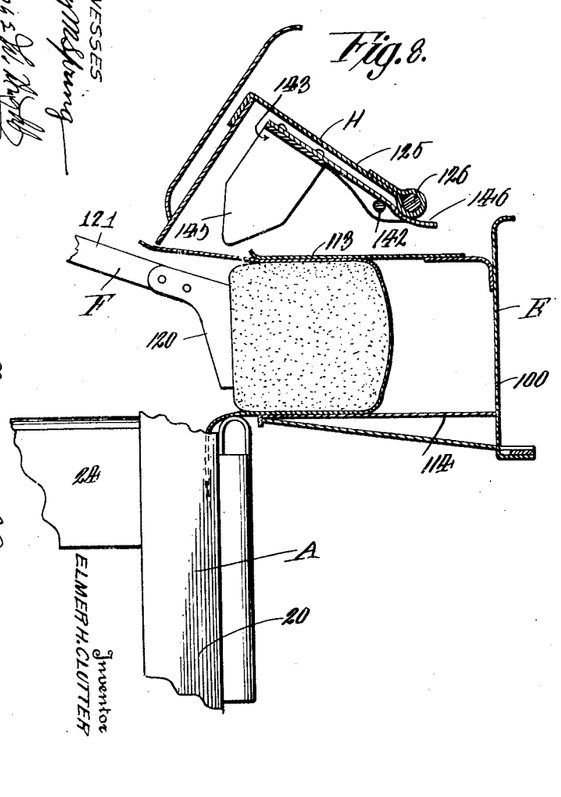
Figure 8 is a similar view showing the loaf of bread being placed in the carriage.
Figure 9:
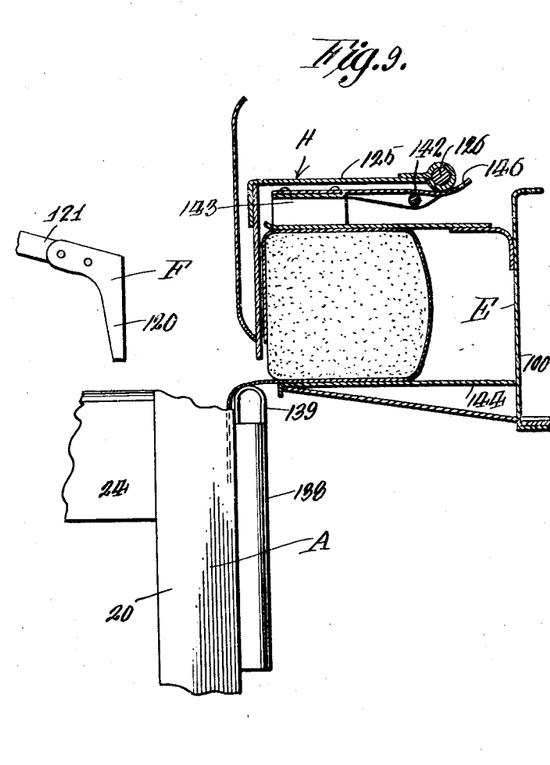
Figure 9 is a fragmentary longitudinal section showing the position of a loaf of bread in the carriage and one flap of the bottom fold being folded into place.
Figure 10:
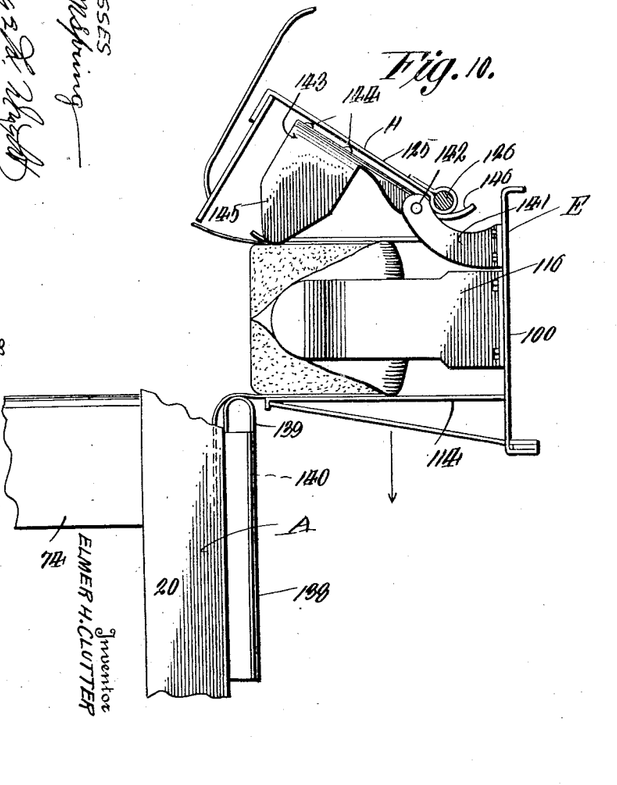
Figure 10 is a view similar to Figure 8 showing the side arms arranged on the carriage for initially turning in the central folds of the end closures.

The means H for folding the paper about the bread comprises an angle-shaped plate 125 mounted upon a shaft 126 carried by the frame. The forward part of the folder 125, when the folder is brought down, is adapted to press one fold of the bottom closure of the wrapper in place as clearly shown in Figure 9 of the drawings. This right-angle shaped folder 125 is adapted to be moved into an operative position after the pressure foot has forced the bread into the carriage E as shown in Figure 8 of the drawings and the pressure foot has moved back to its normal position. The shaft 126 is rockably mounted on the main frame A and has rigidly secured to one end thereof the strip lever 127. The mechanism for operating the folder plate 125 is clearly shown in Figure 2 of the drawings. The main frame A has slidably mounted on one of the side bars 25 an operating bar 128. This bar is provided with guide slots 129 through which protrude the holding pins 130. The pins 130 can be provided with heads or bearing plates 131. The sliding bar 128 at a point intermediate its ends is provided with an upstanding lug 132 which is disposed in the track of the spaced shoulders 133 and 134 formed on the operating arm 135, which is secured to the reciprocating frame 70. This arm 135 extends rearwardly of the frame and the shoulders 133 and 134 are formed by notching the lower surface of the said arm 135. An operating foot 135' is formed on the extreme rear end of the arm 135 and is provided for operating the trip 127 in conjunction with the bar 128. The rear end of the operating bar 128 has a depending angular extension 136 which is provided with an upstanding lug 137, which is provided for actuating the trip 127 and for holding the same against movement when the bread is placed in the carriage, as will now be described. When the reciprocating frame 70 is moved to its extreme forward position, the rear notch 133 engages the lug 132 and pulls the slide bar 128 forwardly a sufficient distance for the lug 137 to pass under the trip 127 which locks and holds the bottom folder 125 open until the frame 70 again moves forward and by means of the depressor or pressure foot 120 places the loaf into the carriage E. As the part or arm 135 moves rearwardly and the carriage reaches its extreme rear position, the shoulder 134 engages the lug 132 and moves the slide bar 128 rearwardly and the lug 137 from under the trip 127, which releases the same. At the same time the foot 135' of the arm 135 reaches the top of the trip 127 and continues to hold the bottom folder 125 open and at the same time raises it slightly higher at the moment the loaf is passed into the carriage. When the arm 135 moves forward and the pressure foot 120 moves away from the loaf, the trip 127 being free, allows the bottom folder 125 to close over the loaf and remain closed until the loaf is moved down by the carriage. By the continued forward movement of the frame 70 the folders again open for the next loaf coming into the carriage E and it can be seen that when the carriage reaches its extreme rearward position that the lug 137 will rock the trip 127 for rocking and holding the folding plate 125 in a raised position. In other words, the combination of the parts or mechanism operates the bottom folder to hold the same open until the load passes into the carriage, at which time the same is lowered slowly to fold the top half of the bottom closure and remains closed to hold the paper in place until the carriage is moved downward and the bottom closure is completed. When it is again opened for the next loaf coming into the carriage.

Figures 6, 12:
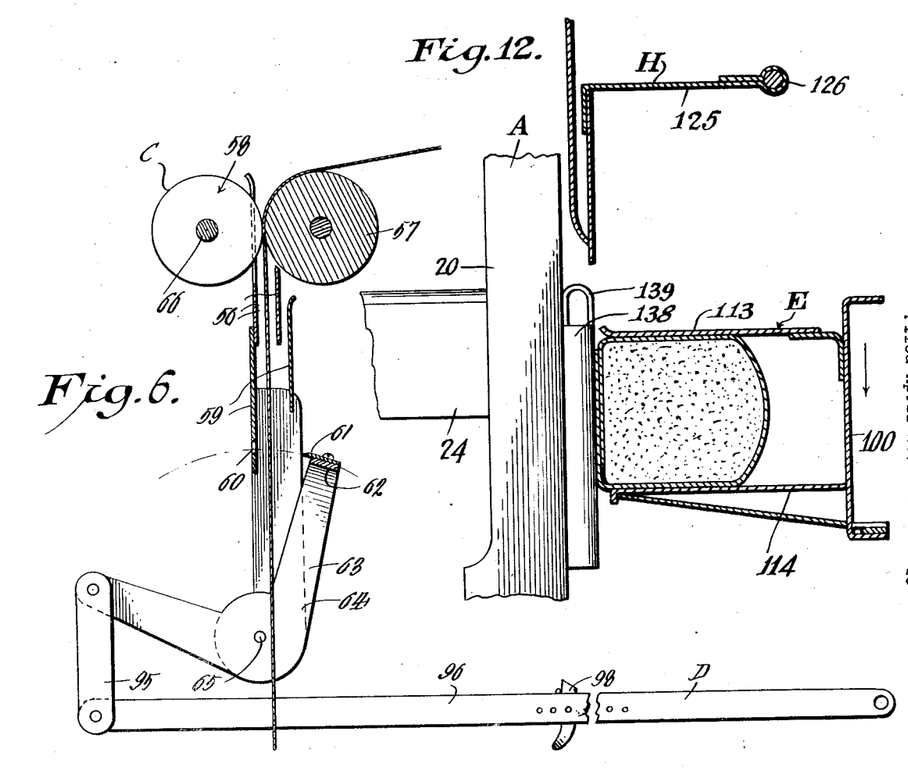
Figure 6 is an enlarged longitudinal section illustrating the feeding rollers for the paper and the means for cutting the paper into the desired length.
Figure 12 is a view similar to Figure 11 showing the carriage in section.
Figure 7:
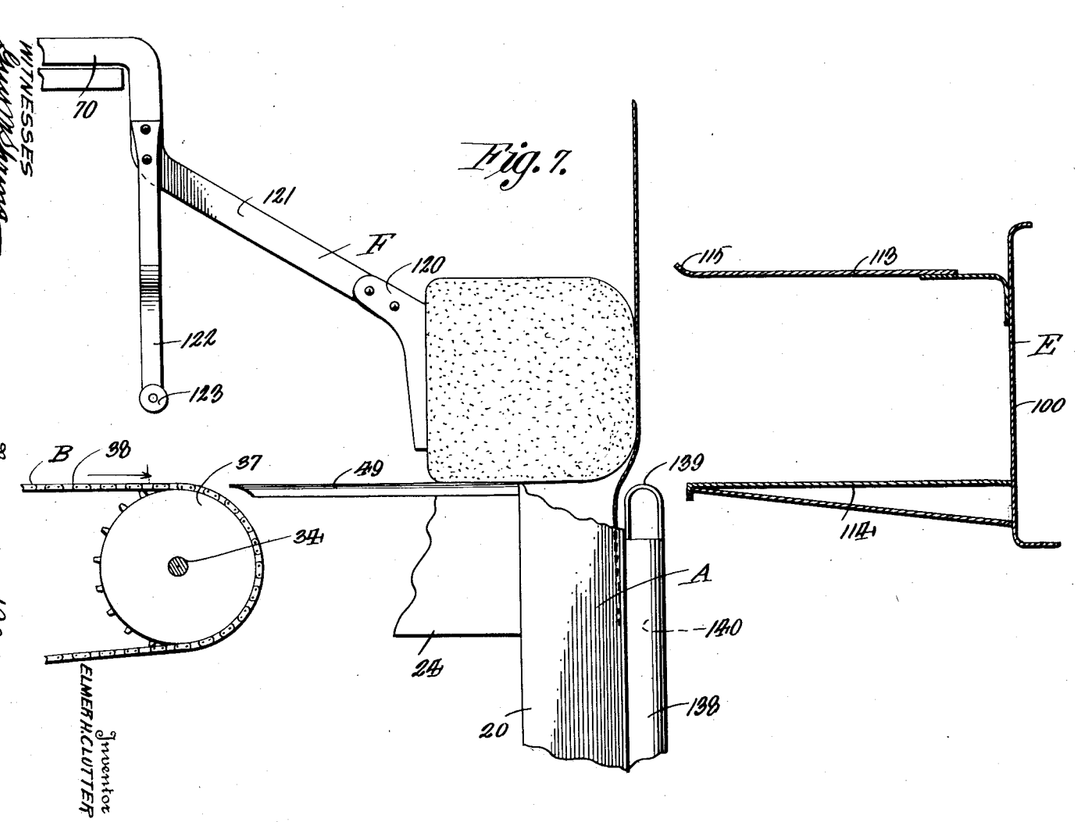
Figure 7 is an enlarged fragmentary section showing the position of a loaf of bread, the wrapping paper and the carriage, prior to the forcing of the loaf of bread to the carriage.
Figure 11:
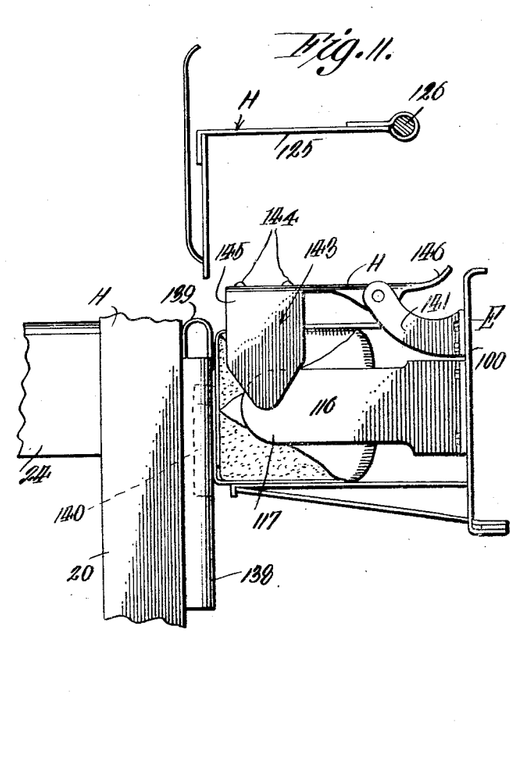
Figure 11 is a view similar to Figure 10 showing the carriage partially moved down and the other flap of the bottom closure moved to its folded position and the bottom flap being moved past the bottom flap sealing mechanism and the means for holding one of the side folds of the end closures in place.

Now as the carriage moves downward, the second half of the bottom closure is made and this is clearly shown in Figures 11 and 12 of the drawings. The carriage, carries the loaf past a plate 138 arranged vertically in the frame and the top of this plate is provided with a curved top wall 139 and it can be seen that the curvature of the top wall 139 and the plate 138 will make the second half of the bottom closure. This plate 138 has arranged directly in rear thereof an electric heating element 140 which is adapted to melt the wax on the paper, as the loaf moves down so as to permit the flaps of the bottom closure to adhere to one another and thus seal the said closure.

The back wall 100 of the carriage E carries a pair of spaced brackets 141 which rockably support a shaft 142 to which is secured one side folder 143 for the end closures of the wrapper. This side flap folder embodies a top plate 144 and depending side arms 145 which are slightly flared outwardly. It is obvious that when the bottom folder 125 drops down, that the same will move the side folder 143 therewith so as to make certain side flaps of the end closures of the wrapper. This side folder 143 is provided with a rearwardly extending arcuate tongue 146 and it can be seen that when the carriage is carried back to its raised position for receiving a new loaf that the shaft 126 will engage the said tongue 146 and raise the side flap folder 143 to a position shown in Figure 10 of the drawings. As the carriage moves down as shown in Figure 11 of the drawings the side arm 145 and the side flap folder 143 hold the said side flaps in place as clearly shown in Figure 11.

Figure 13:
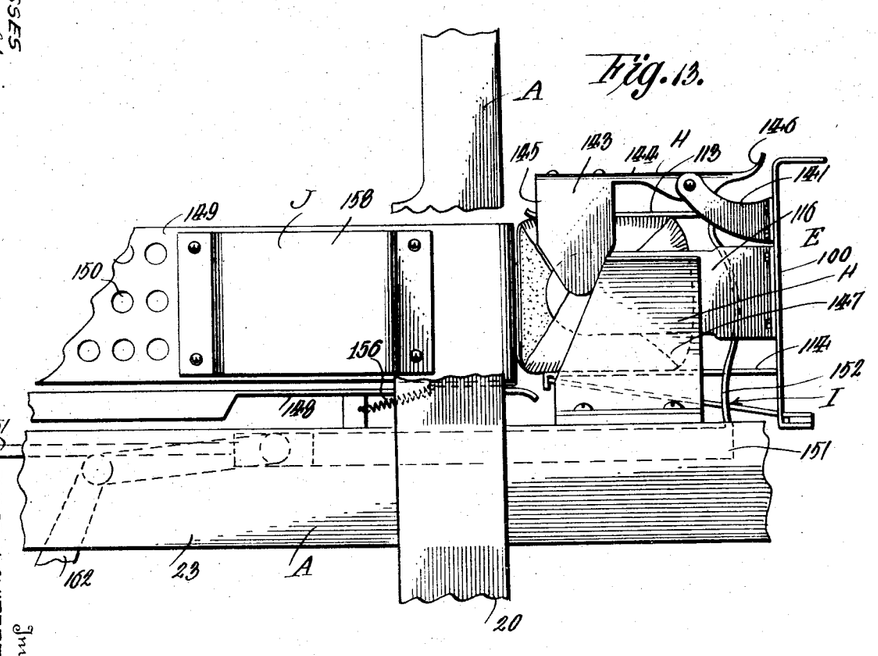
Figure 13 is an enlarged fragmentary view through the machine showing the carriage in its completely lowered position with the means for moving the other side flaps of the end closures into place.
Figure 14:
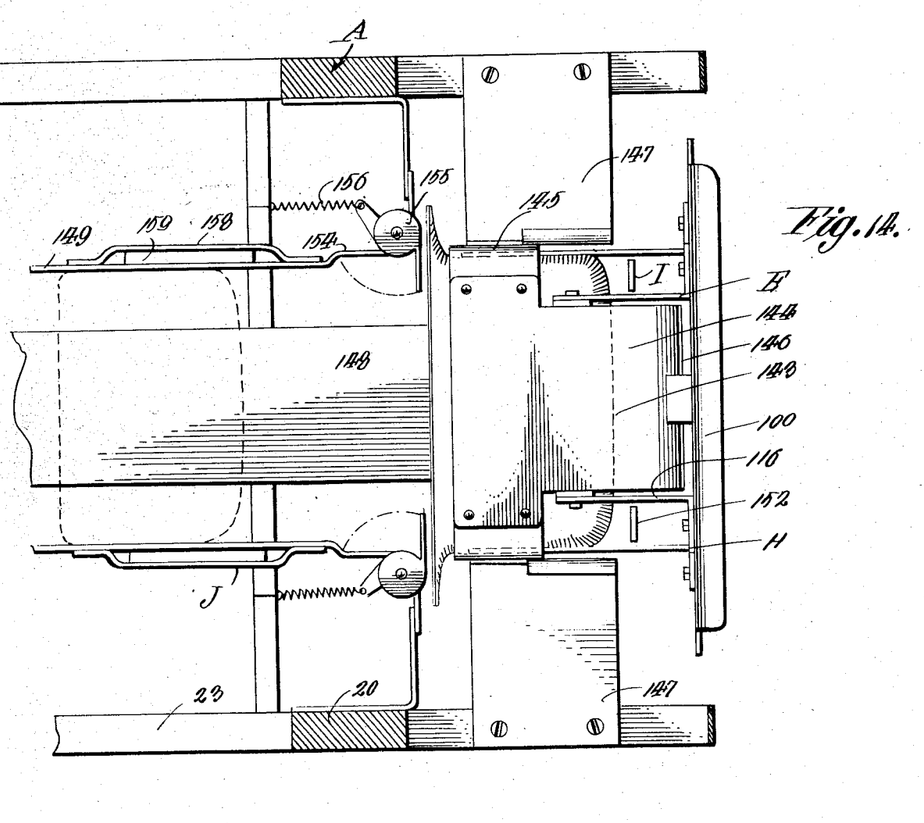
Figure 14 is an enlarged horizontal section through the machine showing the carriage in its lowered position, with the loaf of bread waiting to be forced off of the carriage onto the unloading platform and between the sealing device for the end flaps.

When the carriage reaches its extreme lowered position as shown in Figures 13 and 14 of the drawings, the other side flaps of the enclosures are formed into place by upstanding side plates 147 which are secured to the rear ends of the longitudinally extending side bars 23 of the main frame A. The loaf of bread is now ready to be taken from the carriage and the mechanism I for forcing the bread from the carriage onto the receiving platform 148 is brought into play. It is to be noted that the receiving platform 148 extends the entire length of the frame A and is provided with side guide plates 149 which are provided with a plurality of apertures 150 and these plates constitute cooling means for cooling the wrapper after the enclosures have been sealed, as will be hereinafter more fully described. Arranged below the receiving platform 148 is a rearwardly extending arm 151, which carries a pair of upstanding bowed resilient arms 152 which are adapted to rest on each side of the bottom wall 114 of the carriage E when the carriage is moved to its extreme forward position. After the carriage E comes to rest the arm 151 is moved forwardly, by means which will now be described for bringing the upstanding resilient arms 152 into engagement with the loaf for forcing the loaf from the carriage onto the receiving platform 148. It is to be noted at this time that when the loaf of bread is forced onto the receiving platform 148 that the bottom flaps of the enclosures will be swung into position. This is brought about in the following manner: The extreme rear ends of the side guide plates 149 are flared outwardly as at 154 and carry pivoted folding dogs 155 at their extreme ends. These folding dogs 155 are adapted to swing into the flared portions 154 of the guide plates 149 when the loaf is forced onto the platform. It is obvious of course that these dogs will fold back the bottom flaps of the end closures. Contractile coil springs 156 are connected with the folding dogs 155 so as to normally hold the end closures in place before the loaf is placed between the guide plates 149. Now it is to be noted also that the rear wall of the side guide plates 149 have sheet metal pockets 158 thereon and these pockets are adapted to receive electric heating elements 159. It thus can be seen that when the bread is forced between the side plates 149 past the pockets 158 that the heating elements will melt the wax on the folds of the end closures so as to cause the adhering of the flaps after the same has become cool. As heretobefore stated the side guide plates act as cooling means for the enclosures of the wrapper after the bread has been moved past the heating elements 159.

It is to be noted that the rod or arm 151 which carries the resilient arms 152 is mounted for sliding movement in suitable bushings 160 carried by the frame.

The mechanism for operating the means I embodies a link 161 which is connected to the rod 151 at one end and pivotally connected to the operating lever 162 at its opposite end. This lever 162 is rockably mounted on a bracket 163 carried by the bottom platform adjacent to the lower end of the said lever. The extreme lower end of the lever 162 is pivoted as at 164 to the yoke 165. The yoke is of a substantially U-shape and embodies an upper relatively short arm 166 and a lower relatively long arm 167. The forward end of the relatively short arm 166 is provided with an arcuate notch 168, while the forward end of the relatively long arm is provided with a lug 169. These arms are adapted to be engaged by operating pins 170 carried by the cam 120. It is obvious that when the pin 170 engages the arcuate notch 168 of the upper arm 166 that the yoke 165 will be pressed rearwardly which in turn will rock the lever 162 causing the arms 152 to move forwardly, thrusting the loaf from the carriage E onto the receiving platform 148. As the pin 170 turns around within the yoke the same will engage the lug 169 of the relatively long arm 167 causing the forward movement of the yoke which will return the lever to its normal position and the arms 152 back to their normal position in rear of the side folder plates 147. In order to support the yoke 165, the same carries a laterally extending bifurcated arm 171 which is arranged at one side of the pin 170. This bifurcated arm 171 slides back and forth in slotted bushings 172 carried by the shaft 45. In operation of the improved machine, the loaves of bread are placed on the endless conveyor sideways in engagement with the lugs 39 and brought into the machine onto the receiving platform 49, as heretobefore stated. The space in the lugs of the chain are such that these lugs will deliver a loaf of bread with each revolution of the machine or each time the complete wrapping mechanism is brought into play. During the travel of the bread to the loading platform 49, the paper feeding and cutting mechanism is brought into play as heretobefore described, and the pressure foot 120 forces the bread onto the carriage E with a strip of paper about the same. The carriage is moved downward and the mechanism G, heretobefore described, is brought into play and the bottom fold of the wrapper is made, and the end closures are partly made. After the carriage is moved to its extreme lowered position the extractor eye is brought into play and forcing the loaf of bread onto the receiving platform 148 which finishes the folding of the end flaps and the heating mechanism J is brought into place to seal the end closures as heretobefore described. The continuous placing of a loaf of bread onto the platform will gradually force the bread outward of the front of the machine onto the inclined table 175, when the bread can be readily grasped by the operator and placed into a suitable receptacle. This table 175 is held in place by brackets 176 as clearly shown in Figure 1 of the drawings.

From the foregoing description, it can be seen that I have provided a complete bread-wrapping machine, in which the bread is automatically fed into the machine, wrapped, sealed and delivered to the front of the machine to the operator.

It is to be understood that in actual practice, the machine is to be made adjustable so as to permit loaves of different sizes to be wrapped, no carriage adjustment being required for the height of the loaf as same is constructed with ample room to permit the tallest loaf that would be wrapped by the machine, it being understood that the loaf is placed into the carriage on its side. To adjust for the width of the loaf it is necessary to open or close the carriage plates or top and bottom walls 113 and 114 on the back plate 100. The plates 113 and 114 should fit the loaf snug in order to pull the paper tight around the bread. Adjustments for the length of the loaf are made by first adjusting the guide rods 50, and the sides of the conveyor to suit the length of the loaves. The end folders 143, 147 and 116 are then adjusted for the proper length as well as the end sealing means J and cooling plates 149. Different sized loaves required different lengths of paper. Therefore to adjust the different lengths of the paper which the machine draws, it is necessary to move the rack 80 to the proper place on the rack support 79 by moving it back from its forward position so as to give it a lesser stroke. To adjust the sheet of paper as to its relation to the loaf of bread it is necessary to raise or lower the knife up or down from the guide pull rolls or wherever the paper is cut it will again start. As for the length of the loaf a roll of paper of the proper width is used.

Changes in details may be made without departing from the spirit or the scope of this invention, but what I claim as new is:—

1. In a bread-wrapping machine, a frame, an endless conveyor carried by the frame, guides for receiving a paper strip arranged above and at the inner end of the endless conveyor, a feed roller for engaging the paper strip for feeding a predetermined quantity of the paper between said guides and in rear of the endless conveyor, a reciprocatory rack bar arranged normally below the feed roller, a pinion secured to the feed roller and adapted to be engaged by the rack bar at a predetermined time, and means actuated by incoming loaves of bread for raising the rack bar into engagement with said pinion, as and for the purpose specified.

2. In a bread-wrapping machine, a frame, means for feeding loaves of bread into the machine at predetermined spaced intervals, guides for receiving a strip of paper arranged above and in rear of the frame, means for feeding paper through the guides and in rear of the endless conveyor, including a feed roller, a pinion secured to the feed roller, a reciprocatory frame mounted within the main frame, means for reciprocating the frame, a rack bar slidably carried by the reciprocatory frame arranged to engage the pinion, when in its raised position, and means for raising the rack bar at predetermined times by the incoming loaves of bread, said means including a depending trip arm arranged in the path of the loaves of bread for cooperation with the sliding rack bar.

3. In a bread-wrapping machine, a frame, an endless conveyor for feeding bread into the machine at spaced intervals carried by the frame, means for rotatably supporting a roll of paper, means for frictionally engaging the paper roll for preventing accidental rotation thereof, paper guides carried by the frame arranged above and in rear of the endless conveyor, a rotatable feed roller for engaging the paper strip and feeding a predetermined quantity of paper from off of the roll at predetermined times, between the guides and in rear of the conveyor, a pinion keyed to the roll, and a reciprocatory frame mounted within the main frame, means for continuously reciprocating said reciprocatory frame, a rack bar slidably carried by the riciprocatory frame adapted to be raised and lowered into and out of engagement with the pinion, means for raising and lowering said rack bar for actuating the pinion and feed roller including a transversely extending rockable bar, a depending trip arm rigidly secured to the rock bar arranged directly above the endless conveyor and in the path of the incoming loaves of bread, whereby the bar will be raised and lowered by the bread coming into the machine, a pivoted lifting lever operatively connected wth the rack bar for raising the same, and means for operatively connecting the rocking bar with said lifting means.

4. In a bread-wrapping machine, a main supporting frame, an endless conveyor carried by the main supporting frame for feeding loaves of bread into the machine a loaf at a time, a reciprocatory frame carried by the main supporting frame, paper guides carried by the frame arranged above and in rear of the endless conveyor, a feed roller for feeding the paper between the guides, and in rear of the endless conveyor, means actuated by incoming loaves of bread for operating the feed roller from the reciprocatory frame, means for continuously reciprocating said reciprocatory frame, means for cutting the paper strip after the same has been fed from off of the roll and the bread has left the conveyor, including a bell crank, a transversely extending paper cutting knife connected with the bell crank, a rocking lever, means for operatively connecting the rocking lever with one arm of the bell crank, and means actuated by the reciprocatory frame for rocking the lever at predetermined times.

5. In a bread-wrapping machine, a frame, an endless conveyor extending into the frame for feeding loaves of bread one at a time into the machine, a reciprocatory operating frame mounted within the first mentioned frame, means for reciprocating said operating frame, means operated from and set into operation by incoming loaves of bread for feeding a predetermined length of paper in rear of the endless conveyor, means for cutting the strip of paper after the bread has left the conveyor including a transversely extending paper cutting knife, a rocking frame supporting the knife including a bell crank pivoted at its angle, an operating lever pivoted at its forward end to the first mentioned frame, a link for operatively connecting the rear end of the operating lever with the forward arm of the bell crank, a pivoted dog carried by the operating lever, means for adjusting the dog on said operating lever, and a trip arm carried by the reciprocatory frame for engaging the dog for rocking said operating lever at predetermined intervals for operating said knife, as and for the purpose specified.

6. In a bread-wrapping machine, a supporting frame, an endless conveyor carried by the frame for feeding loaves of bread one at a time into the machine, a feed roller mounted upon the frame for feeding a strip of paper in rear of the conveyor at predetermined intervals, a reciprocatory frame mounted within the main frame, means for reciprocating said reciprocatory frame, means for operating the feed roll and set in operation by the incoming loaves of bread from the said reciprocatory frame, means for cutting the strip of paper from the reciprocatory frame after the bread has left the conveyor, a reciprocatory carriage arranged in the rear of the endless conveyor, and means for forcing the bread into the carriage in advance of the paper strip, whereby the paper strip will be partially folded about the bread.

7. In a bread-wrapping machine, a supporting frame, an endless conveyor for feeding bread into the machine, one loaf at a time, a reciprocatory frame carried by the first mentioned frame, means for continuously reciprocating said frame, means operated from and set in actuation by the incoming loaves of bread for feeding strips of paper in rear of the endless conveyor, means operated from the reciprocatory frame for cutting the strip of paper, a reciprocatory carriage in rear of the conveyor, means for reciprocating the carriage, said carriage including upper and lower plates, and a pressure foot for forcing the loaf of bread into the carriage in advance of the paper strip, whereby the paper strip will be partially folded about the bread, and means for operating the pressure foot from said reciprocatory frame.

8. In a bread-wrapping machine, a supporting frame, means for feeding loaves of bread into the frame one at a time, a reciprocatory frame carried by the supporting frame, above said means for feeding the bread into the machine, a roller for feeding paper into the machine, means operated from the reciprocatory frame and set in operation by incoming loaves of bread for actuating said feed roller, means for guiding the paper strip in rear of the means for feeding the paper strip into the machine, a vertically reciprocatory carriage, means for reciprocating the carriage, the carriage while at its extreme upper-most position being arranged directly in rear of the means for feeding the bread into the machine and said paper strip, and a pressure foot for forcing the bread into the carriage in front of the paper strip, means for rockably connecting the pressure foot to the reciprocatory frame, and means for raising and lowering said pressure foot during the travel of said reciprocatory frame, as and for the purpose specified.

9. In a bread-wrapping machine, a supporting frame, an endless conveyor for feeding bread a loaf at a time into the machine supported by said frame, a reciprocatory frame carried by the main frame, means for reciprocating the frame, a platform arranged directly in rear of the conveyor upon which the loaves of bread are adapted to be delivered, a feed roller for feeding paper into the machine, means operated from and set in actuation by the reciprocatory frame for operating said feed roller, guides for feeding the paper in rear of the platform, a reciprocatory carriage mounted within the supporting frame in rear of the conveyor, means for reciprocating said carriage, the carriage including top and bottom folding plates, and side folding arms, means operated by the reciprocatory frame for forcing bread from the platform into the carriage, said top and bottom folding plates and side arms forming means for partially folding the strip of paper about the loaf of bread when the same is forced into the carriage, means arranged in the path of the carriage for completing the bottom fold of the wrapper, and a heating means carried by said last mentioned means for sealing the bottom fold.

10. In a bread-wrapping machine, an endless conveyor for feeding bread into the machine, a vertically reciprocatory carriage arranged in rear of the conveyor, means for operating the carriage and conveyor, the carriage including top and bottom folding plates, and side folding arms, a reciprocatory frame, means for reciprocating the frame, a pivoted folding member for folding the first flaps of the bottom fold about the bread, means for operating said bottom folder from the reciprocatory frame, means arranged in the path of the carriage for folding the second flaps of the bottom fold, and a heating element carried by said last mentioned folding means for sealing said bottom fold.

11. In a bread-wrapping machine, a supporting frame, an endless conveyor for feeding bread into the machine, a vertically reciprocatory carriage carried by the supporting frame arranged directly in rear of the endless conveyor, means actuated by incoming loaves of bread for feeding a strip of paper in front of the carriage, means for cutting the strip of paper, the carriage including top and bottom folding plates, and side folding arms, a pivoted bottom flap folder carried by the supporting frame, means for raising said bottom folder, means for lowering the bottom flap folder when the carriage has reached its uppermost position, means for forcing the bread into the carriage in advance of the paper strip prior to the actuation of said bottom folder, a plate arranged in the path of the carriage for making the second flap of the bottom fold, a heating element carried by said plate for sealing the bottom fold, and arms arranged in the path of the carriage for making side flaps of the end folds of the wrapper.

12. In a bread wrapping machine, a frame, an endless conveyor carried by the frame for feeding loaves of bread into the machine, a vertically reciprocatory carriage carried by the frame and arranged in rear of the conveyor, a reciprocatory frame, means operated from the reciprocatory frame and set in actuation by incoming loaves of bread for feeding a paper strip in rear of the conveyor, means actuated from the reciprocatory frame for cutting the paper strip at a predetermined time, means operated from the reciprocatory carriage for forcing the bread into the carriage, said carriage including top and bottom plates for forming the side walls of the wrapper, folding arms for forming one end of the end flaps for the end closures of the wrapper, a pivoted bottom flap former carried by the platform and arranged above the carriage, means for operating the bottom flap former from the reciprocatory frame when the carriage has reached its uppermost position and the loaf of bread has been placed therein, a pivoted end flap former carried by the carriage, and means for operating said end flap former from said bottom flap former.

13. In a bread-wrapping machine, a supporting frame, an endless conveyor carried by the frame arranged to feed loaves of bread one at a time into the same, a reciprocatory carriage carried by the frame and arranged in rear of the conveyor, a recipocatory frame, means for operating the reciprocatory frame, means operated from the reciprocatory frame and set in actuation by incoming loaves of bread for feeding a paper strip in front of the carriage and in rear of the conveyor, means for reciprocating the carriage, said carriage including upper and lower plates for making the side walls of the wrapper, rigid forwardly extending arms for forming said end flaps of the enclosures of the wrapper, a pivoted bottom forming flap folder carried by the frame, means operated from the reciprocatory frame for actuating said bottom flap former at predetermined intervals, means to operate from the bottom flap former for forming other side flaps of the end closures, a plate arranged in the path of the carriage for making the other flap of the bottom closure of the wrapper, means for sealing said flap, means arranged in the path of the carriage adapted to engage the wrapper at the extreme end of the stroke of the carriage for forming other end flaps of the end closures of the wrapper, means for forcing the bread from the carriage, and means for forming the final end flaps of the end closures and sealing said end closures when the bread is forced from the carriage.

14. In a bread-wrapping machine, a frame, an endless conveyor extending into the frame for feeding loaves of bread one at a time into the frame, a vertically reciprocatory carriage carried by the frame arranged in rear of the conveyor, a reciprocatory operating frame, means for operating said reciprocatory operating frame, means operated from said reciprocatory frame and set in actuation by incoming loaves of bread for feeding a strip of paper in rear of the conveyor in front of the reciprocatory carriage, means for continuously reciprocating said carriage, means for forcing bread into the carriage, means for folding the strip of paper about the bread during the placing of the bread into the carriage and the movement of the carriage, a receiving platform carried by the first mentioned frame and arranged in rear of the carriage at the extreme end of its lowermost stroke, means for pushing the bread from off of the carriage onto said receiving platform, means carried by the rear of the receiving platform for heating the end closures of the wrapper to seal the same, and cooling side plates carried by the platform for cooling said end closures after being sealed.

15. In a bread-wrapping machine, a main frame, an endless conveyor arranged to feed loaves of bread one at a time into the frame, a vertically reciprocatory carriage mounted within the frame, a horizontally reciprocatory operating frame carried by the main frame, means for reciprocating said operating frame with said carriage from a common prime mover, means operated from the reciprocatory operating frame and set in actuation by incoming loaves of bread for feeding a strip of paper in back of the carriage, means operated from the reciprocatory operating frame for cutting the paper at a predetermined time, means for folding the strip about the bread during the placing of the bread into the carriage and the movement of the carriage, means operated from the reciprocatory operating frame for forcing the bread into the carriage, means for removing the bread from the carriage at the lowermost position of the carriage, said means including a horizontally movable arm, upstanding tongues carried by the arm arranged to move in the path of the carriage, a receiving platform for receiving the bread from the carriage, means for reciprocating said arm carrying the tongues from said prime mover.

In testimony whereof I affix my signature.

ELMER H. CLUTTER.